(12) United States Patent
Zhou et al.

(10) Patent No.: US 11,325,410 B2
(45) Date of Patent: May 10, 2022

(54) FABRIC PRINTABLE MEDIUM

(71) Applicant: HEWLETT-PACKARD DEVELOPMENT COMPANY, L.P., Spring, TX (US)

(72) Inventors: Xiaoqi Zhou, San Diego, CA (US); Xulong Fu, San Diego, CA (US); Dheya M. Alfekri, San Diego, CA (US); Douglas Knight, San Diego, CA (US); Ronald J. Selensky, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,346

(22) PCT Filed: Mar. 19, 2018

(86) PCT No.: PCT/US2018/023167
§ 371 (c)(1),
(2) Date: Oct. 25, 2019

(87) PCT Pub. No.: WO2019/182558
PCT Pub. Date: Sep. 26, 2019

(65) Prior Publication Data
US 2021/0070085 A1 Mar. 11, 2021

(51) Int. Cl.
*B41M 5/50* (2006.01)
*B41M 5/52* (2006.01)
*D06P 5/30* (2006.01)
*D06N 3/04* (2006.01)
*D06P 1/52* (2006.01)
(Continued)

(52) U.S. Cl.
CPC ........... *B41M 5/5272* (2013.01); *D06N 3/047* (2013.01); *D06P 1/5285* (2013.01); *D06P 1/54* (2013.01); *D06P 5/002* (2013.01); *D06P 5/30* (2013.01); *D06M 15/564* (2013.01); *D06M 17/00* (2013.01); *D06M 2200/12* (2013.01);
(Continued)

(58) Field of Classification Search
CPC ................. B41M 5/5272; D06N 3/047; D06N 2209/105; D06N 2209/142; D06N 2209/1657; D06P 1/5285; D06P 1/54; D06P 5/002; D06P 5/30
USPC ....................................... 428/32.16
See application file for complete search history.

(56) References Cited

U.S. PATENT DOCUMENTS

| 5,359,735 A | 11/1994 | Stockwell |
| 5,503,076 A | 4/1996 | Yeo |

(Continued)

FOREIGN PATENT DOCUMENTS

| CN | 203957462 U | 11/2014 |
| CN | 104921382 A | 9/2015 |

(Continued)

*Primary Examiner* — Betelhem Shewareged
(74) *Attorney, Agent, or Firm* — Dierker & Kavanaugh PC

(57) ABSTRACT

A fabric printable medium includes a fabric base substrate, which includes yarn strands and voids among the yarn strands. The fabric printable medium further includes a finishing coating attached to the yarn strands of the fabric base substrate to form coated yarn strands. The finishing coating includes a first and a second crosslinked polymeric network. The fabric printable medium has pore spaces among the coated yarn strands that coincide with at least some of the voids of the fabric base substrate.

16 Claims, 2 Drawing Sheets

(51) Int. Cl.
*D06P 1/54* (2006.01)
*D06P 5/00* (2006.01)
*D06M 15/564* (2006.01)
*D06M 17/00* (2006.01)

(52) U.S. Cl.
CPC . *D06N 2209/105* (2013.01); *D06N 2209/142* (2013.01); *D06N 2209/1657* (2013.01)

(56) References Cited

U.S. PATENT DOCUMENTS

| | | | |
|---|---|---|---|
| 5,753,568 | A | 5/1998 | Shimano et al. |
| 6,001,137 | A | 12/1999 | Alfekri et al. |
| 6,326,323 | B1 | 12/2001 | Shimano et al. |
| 6,478,980 | B2 | 11/2002 | Nigam |
| 6,689,517 | B1 | 2/2004 | Kaminsky et al. |
| 2002/0164462 | A1 | 11/2002 | Kohsaka |
| 2003/0157303 | A1 | 8/2003 | Li et al. |
| 2003/0162017 | A1* | 8/2003 | Weir ........................ B32B 27/08 428/354 |
| 2005/0245156 | A1 | 11/2005 | Cates et al. |
| 2006/0270298 | A1 | 11/2006 | Kuhn et al. |
| 2006/0281849 | A1 | 12/2006 | Johnson |
| 2009/0176087 | A1 | 7/2009 | Yoon |
| 2011/0008542 | A1* | 1/2011 | Zeng ........................ B41M 5/502 427/288 |
| 2011/0102497 | A1 | 5/2011 | Sato et al. |
| 2013/0309514 | A1 | 11/2013 | You et al. |
| 2015/0132508 | A1 | 5/2015 | Zhou et al. |
| 2016/0152060 | A1 | 6/2016 | Zhou et al. |
| 2016/0159107 | A1 | 6/2016 | Niu |
| 2016/0207039 | A1 | 7/2016 | Vella et al. |
| 2016/0332471 | A1 | 11/2016 | Zhou |

FOREIGN PATENT DOCUMENTS

| | | |
|---|---|---|
| EP | 2415428 A1 | 2/2012 |
| JP | 2001001635 A | 1/2001 |
| JP | 2002321452 A | 11/2002 |
| WO | WO2017196354 A1 | 11/2017 |

* cited by examiner

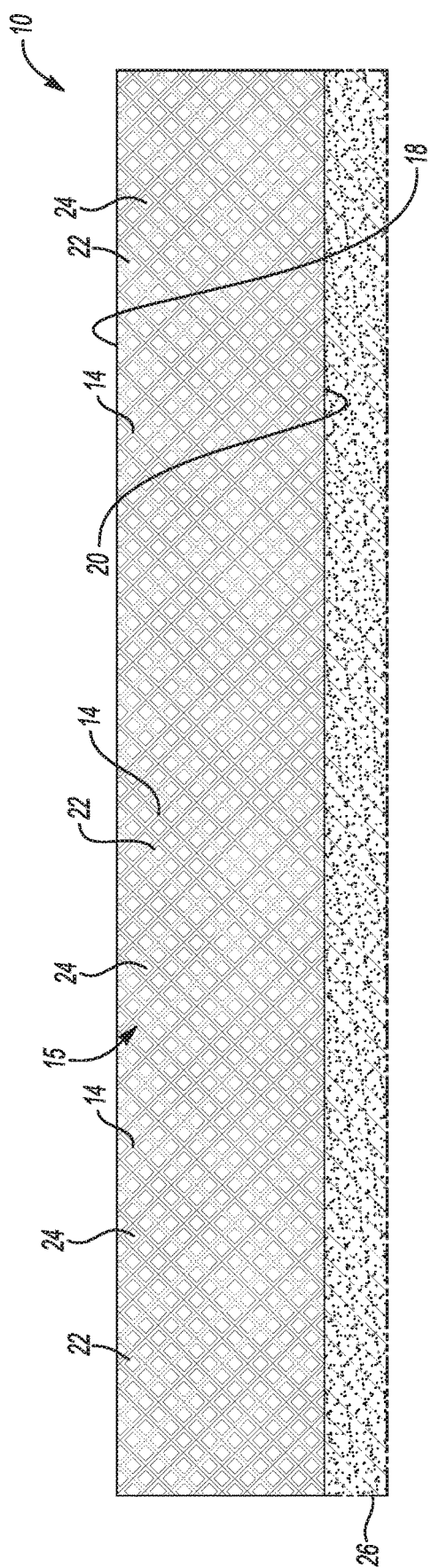

FABRIC PRINTABLE MEDIUM

BACKGROUND

The application of inkjet printing technology has been expanded to large format, high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has been used on different substrates including, for examples, cellulose paper, metal, plastic, fabric/textile, and the like. The substrate plays a key role in the overall image quality and permanence of the printed images. Textile printing has various applications including the creation of signs, banners, artwork, apparel, wall coverings, window coverings, upholstery, pillows, blankets, flags, tote bags, etc.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1A is a schematic and cross-sectional view of an example of the fabric printable medium disclosed herein;

DETAILED DESCRIPTION

Figure 1B:
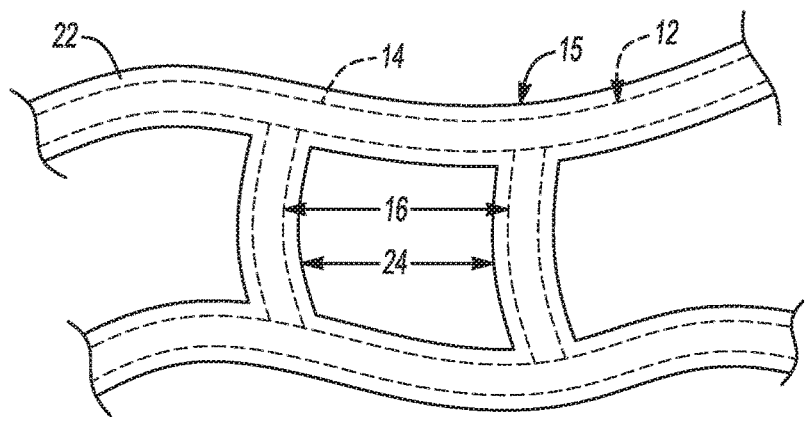
FIG. 1B is an enlarged, cut-away top view of an example of coated yarn strands of the fabric printable medium of FIG. 1A.

When printing on fabric substrates, challenges exist due to the specific nature of the fabric. Some fabrics, for instance, can be highly absorptive of aqueous inks, which can diminish color characteristics of the printed image. Other fabrics, such as some synthetic fabrics, can be crystalline, and thus are less absorptive of aqueous inks. When the inks are not adequately absorbed, performance issues can result. These characteristics (e.g., diminished color, ink bleed) can result in poor image quality on the respective fabrics. Additionally, black optical density, color gamut, and sharpness of the printed images can be affected, and are often worse on fabrics when compared to images printed on cellulose paper or other media types. Durability, such as scratch resistance, rub resistance, folding resistance, and wind resistance, is another concern when printing on fabric, particularly when pigmented inks are used and when the fabric is to be used in an outdoor application.

The fabric printable medium disclosed herein is a printable recording medium (or printable media) that generates high quality printed images that also exhibit outstanding print durability, in terms of scratch resistance, rub resistance, folding resistance, and wind resistance.

By "scratch resistance" and "rub resistance", it is meant herein that the image printed on the medium is resistant to degradation as a result of scuffing or abrasion. The term "scuffing" means that something blunt is dragged across the printed image (like brushing fingertips along printed image), or the medium can fold over on itself exposing the image to repeated surface interactions. Scuffing can result in damage to the printed image. Scuffing does not usually remove colorant but it may change the gloss of the area that was scuffed. The term "abrasion" means that force is applied to the printed image generating friction, usually from another object (such as a coin, fingernail, etc.), which can result in wearing, grinding or rubbing away of the printed image. Abrasion is correlated with removal of colorant (i.e., with a loss in optical density (OD)).

By "folding resistance", it is meant herein that the image printed on the medium is resistant to degradation as a result of being folded and being exposed to weight while in the folded state. The fabric printable medium may be folded when stored and/or shipped. During storage and/or shipping, the folded medium may also be exposed to the weight of another object that is placed on top of the folded medium. The combination of the fold and the weight can cause the printed image to crack or experience colorant removal at or near the fold.

By "wind resistance", it is meant herein that the image printed on the medium is resistant to degradation as a result of being exposed to wind. When used outdoors or in drafty indoor conditions, the fabric printable medium exposed to flapping, which can cause the medium to rub against itself or another object. These conditions can cause the printed image to experience scuffing or, in worse cases, colorant removal and/or can cause the material of the fabric base substrate to shred.

Fabric Printable Medium

The fabric printable medium disclosed herein includes a finishing coating on yarn strands of a fabric base substrate. The finishing coating contributes to the durability of i) the medium itself (e.g., in terms of wind resistance) and ii) the image(s) printed thereon, and also contribute to the quality of the printed image(s). In some examples, the fabric printable medium also includes a waterproof coating positioned at a back of the fabric printable medium (i.e., at the side of the medium that does not receive ink). The waterproof coating can also contribute to durability and image quality.

Referring now to FIGS. 1A and 1B, an example of the fabric printable medium 10 and an enlarged, cut-away view of coated yarn strands 15 of the fabric printable medium 10 are respectively depicted. The fabric printable medium 10 comprises a fabric base substrate 12 including yarn strands 14 and voids 16 among the yarn strands 14; a finishing coating 22 attached to the yarn strands 14 of the fabric base substrate 12 to form coated yarn strands 15, the finishing coating 22 including a first and a second crosslinked polymeric network; and pore spaces 24 among the coated yarn strands 15 and coinciding with at least some of the voids 16 of the fabric base substrate 12. As shown in phantom in FIG. 1A, some examples of the fabric printable medium 10 also include a waterproof coating 26 attached to a back-side 20 the coated yarn strands 15.

Fabric Base Substrate

The fabric printable medium 10 includes the fabric base substrate 12, upon the yarn strands 14 of which the finishing coating 22 is applied. The waterproof coating 26 may also be applied on the coated yarn strands 15. As such, the fabric base substrate 12 is a supporting substrate, in part because it carries the coatings 22, 26 and the image (not shown) that is to be printed.

The fabric base substrate 12 includes yarn strands 14 and voids 16 among the yarn strands 14. As used herein, "yarn" and "yarn strand" refer to a plurality of threads. In an example, the plurality of threads are spun together to form strands. As will be described in more detail below, the strands may have a fabric structure or may be in the form of fibers.

The yarn strands 14 may include natural threads and/or synthetic threads.

Natural threads that may be used include wool, cotton, silk, linen, jute, flax or hemp. Additional threads that may be used include rayon threads or thermoplastic aliphatic polymeric threads derived from renewable resources, such as cornstarch, tapioca products, or sugarcanes. These additional threads can also be referred to as natural threads.

Synthetic threads that may be used include polymeric threads. Examples of polymeric threads include polyvinyl chloride (PVC) threads, or PVC-free threads made of polyester, polyamide, polyimide, polyacrylic, polypropylene, polyethylene, polyurethane, polystyrene, polyaramid (e.g., KEVLAR®), polytetrafluoroethylene (TEFLON®) (both trademarks of E. I. du Pont de Nemours Company), fiberglass, polytrimethylene, polycarbonate, polyethylene terephthalate, or polybutylene terephthalate. It is to be understood that the term "PVC-free" means no polyvinyl chloride (PVC) polymer or vinyl chloride monomer units in the substrate 12. Synthetic threads may also be modified threads from the above-listed polymeric threads. The term "modified threads" refers to polymeric resins that have been made into polymeric threads, where the polymeric threads (one example of the yarn strands 14) and/or the substrate 12 as a whole have undergone a chemical or physical process. Examples of the chemical or physical process include a copolymerization with monomers of other polymers, a chemical grafting reaction to contact a chemical functional group with one or both the polymeric threads and a surface of the substrate 12, a plasma treatment, a solvent treatment (e.g., acid etching), and/or a biological treatment (e.g., an enzyme treatment or antimicrobial treatment to prevent biological degradation).

In some examples, the individual threads of a given yarn strand 14 may be made up of the same type of thread (e.g., natural or synthetic). In other examples, the individual threads of a given yarn strand 14 may be composites or blends of natural and synthetic materials. The natural and synthetic materials may be blended during yarn formation and/or fabric weaving and/or knitting. The weight ratio of natural to synthetic material may vary, and may range anywhere from about 1:99 to about 99:1.

It is to be further understood that different yarn strands 14 may be used together in the fabric base substrate 12. In some examples, the yarn strands 14 used in the fabric base substrate 12 include a combination or mixture of two or more from the above-listed natural threads, a combination or mixture of any of the above-listed natural threads with another natural thread or with a synthetic thread, or a combination or mixture of two or more from the above-listed natural threads with another natural thread or with a synthetic thread. In other examples, the yarn strands 14 used in the fabric base substrate 12 include a combination or mixture of two or more from the above-listed synthetic threads, a combination or mixture of any of the above-listed synthetic threads with another synthetic thread or with a natural thread, or a combination or mixture of two or more from the above-listed synthetic threads with another synthetic thread or with a natural thread. As such, some examples of the fabric base substrate 12 include one yarn 14 containing natural threads and another yarn 14 containing synthetic threads.

When the fabric base substrate 12 includes yarn strands 14 of synthetic threads, the amount of the synthetic yarn strands may range from about 20 wt % to about 90 wt % of the total amount of yarn strands 14. When the fabric base substrate 12 includes yarn 14 of natural threads, the amount of the natural yarn strands may range from about 10 wt % to about 80 wt % of the total amount of yarn strands 14. When the fabric base substrate 12 includes yarn strands 14 of synthetic threads and yarn strands 14 of natural threads (e.g., as a woven structure), the amount of the synthetic yarn strands may be about 90 wt % of the total amount of the yarn strands 14 in the fabric base substrate 12, while the amount of the natural yarn strands may be about 10 wt % of the total amount of the yarn strands 14 in the fabric base substrate 12.

The yarn strands 14 may be configured to have a fabric structure. As used herein, the term "fabric structure" is intended to mean a structure having warp and weft that is one of woven, non-woven, knitted, tufted, crocheted, knotted, or pressured, for example. The terms "warp" and "weft" refer to weaving terms that have their ordinary meaning in the textile arts, and as used herein, e.g., warp refers to lengthwise or longitudinal yarns on a loom, while weft refers to crosswise or transverse yarns on a loom.

In an example, the fabric base substrate 12 can be a woven fabric where warp yarns and weft yarns are mutually positioned at an angle of about 90° (see, e.g., FIG. 1B). This woven fabric may include fabric with a plain weave structure, fabric with twill weave structure where the twill weave produces diagonal lines on a face of the fabric, or a satin weave. In another example, the fabric base substrate 12 can be a knitted fabric with a loop structure including one or both of warp-knit fabric and weft-knit fabric. The weft-knit fabric refers to loops of one row of fabric that are formed from the same yarn strands 14. The warp-knit fabric refers to every loop in the fabric structure that is formed from a separate yarn strands 14, mainly introduced in a longitudinal fabric direction.

In a specific example, the fabric base substrate 12 is woven, knitted, non-woven or tufted and comprises yarn strands 14 selected from the group consisting of wool, cotton, silk, rayon, thermoplastic aliphatic polymers, polyesters, polyamides, polyimides, polypropylene, polyethylene, polystyrene, polytetrafluoroethylene, fiberglass, polycarbonates polytrimethylene terephthalate, polyethylene terephthalate, polybutylene terephthalate, and combinations thereof.

The yarn strands 14 may also be configured as fibers or filaments. In these examples, the fabric base substrate 12 is a non-woven product. The plurality of yarn fibers or filaments may be bonded together and/or interlocked together by a chemical treatment process (e.g., a solvent treatment), a mechanical treatment process (e.g., embossing), a thermal treatment process, a treatment including another substance (such as an adhesive), or a combination of two or more of these processes.

It is to be understood that the configurations of the yarn strands 14 discussed herein include voids 16 among the yarn strands 14. As such, the fiber base substrate 12 is porous. An example of the fiber base substrate 12 is shown in hidden line in FIG. 1B, including the yarn strands 14 and the voids 16. The void 16 encompasses the entire space (extending in the X, Y, and Z directions) between adjacent yarn strands 14.

Thus, the shape and dimensions of each void 16 depends upon the yarn strand 14 and its configuration (e.g., woven, non-woven, etc.).

Examples of the fiber base substrate 12 may be subjected to pre-finishing treatment(s), such as desizing, scouring, bleaching, washing, a heat setting process, and/or treatment with various additives. Examples of suitable additives include one or more of colorant (e.g., pigments, dyes, tints), antistatic agents, brightening agents, nucleating agents, antioxidants, UV (ultraviolet light) stabilizers, fillers, and lubricants. As an example, the fabric base substrate 12 may be pre-treated in a solution containing the substances listed above before applying the coating compositions 22, 26. The additives and/or pre-treatments may be included to improve various properties of the fabric base substrate 12. The amount of any given additive included in the fiber base substrate 12 depends upon the additive, but may range from about 0.1 wt % to about 5 wt %.

In some examples, the fabric base substrate 12 has a basis weight that ranges from about 50 gsm to about 400 gsm. In some other examples, the basis weight of the fabric base substrate 12 can range from about 100 gsm to about 300 gsm.

Based on the discussion of the fabric base substrate 12, it is to be understood that the fabric base substrate 12 may be any textile, cloth, fabric material, fabric clothing, or other fabric product or finished article (e.g., blankets, tablecloths, napkins, bedding material, curtains, carpet, shoes, etc.) that includes the yarn strands 14 and the voids 16 among the yarn strands 14. It is to be further understood that the fabric base substrate 12 does not include materials commonly known as paper (even though paper can include multiple types of natural and synthetic fibers or mixture of both types of fibers). Paper may be defined as a felted sheet, roll or other physical form that is made of various plant fibers (like trees or mixture of plant fibers), in some instances with synthetic fibers, which are laid down on a fine screen from a water suspension.

Finishing Coating and Pore Spaces

The fabric printable medium 10 includes a finishing coating 22. The finishing coating 22 is not a continuous layer across the surface of the fabric base substrate 12, but rather is attached to the surface of the yarn strands 14 to form the coated yarn strands 15. The finishing coating 22 is coated on surfaces of the yarn strands 14 throughout a depth of the fabric base substrate 12.

The fabric printable medium 10 also includes pore spaces 24 among the coated yarn strands 15. The pore spaces 24 coincide with at least some of the voids 16 of the fabric base substrate 12. By "coincide", it is meant that the pore spaces 24 at least substantially align with the voids 16, so that at least some of the voids 16 of the fabric base substrate 12 remain at least partially open to air flow (i.e., are not covered by the finishing coating 22). This is shown in FIG. 1B. As depicted, the finishing coating 22 adheres to the surface of the yarn strands 14 to form coated yarn strands 15, but does not completely cover the voids 16. The space that remains between the pieces of the yarn strands 14 coated with the finishing coating 22 (i.e., the coated yarn strands 15) is referred to as the pore space 24. As shown in FIG. 1B, the pore space 24 may have a slightly different shape and/or slightly smaller dimensions than the void 16 with which it coincides.

In examples, the degree of coverage of the finishing coating 22 is such that at least some of the initial porosity (voids 16) of the fabric base substrate 12 is maintained after the finishing coating 22 is applied to form the coated yarn strands 15. In other words, at least a portion of at least some of the voids 16 remains open after the finishing coating 22 is applied to the yarn strands 14. In an example, at least 33% of the original porosity is maintained after the finishing coating 22 is applied (i.e., 1 pore space 24 is formed for every 3 voids 16). In other words, at least 33% of the voids of the fabric base substrate coincide with the pore spaces 24 of the finishing coating 22. In another example, at least 50% of the original porosity is maintained after the finishing coating 22 is applied (i.e., 1 pore space 24 is formed for every 2 voids 16). In still another example, at least 66% of the original porosity is maintained after the finishing coating 22 is applied (i.e., 2 pore spaces 24 are formed for every 3 voids 16). In yet another example, 100% of the original porosity is maintained after the finishing coating 22 is applied (i.e., 1 pore space 24 is formed for every 1 void 16). The porosity (e.g., voids 16 before coating and pore spaces 24 after coating) may be measured by testing the air flow (mL/min) through the medium 10 per Tappi method T526 (e.g., using a Hagerty Technologies instrument (from Technidyne)) or per Tappi method T-555 (e.g., using a Parker Print-Surf instrument (from Testing Machines, Inc.)), or with another like method and/or instrument).

As shown in FIG. 1A throughout the fabric base substrate 12, the finishing coating 22 covers the surfaces of the yarn strands 14 through the matrix of the fabric base substrate 12. Throughout the depth, at least some of the voids 16 and pore spaces 24 remain open. It is to be understood that this figure represents the coating 22 on the yarn surfaces (i.e., the coated yarn strands 15) and also represents the pore spaces 24 that are defined between the coated yarn strands 15.

The finishing coating 22 provides the fabric base substrate 12 with ink receiving properties and durability, while also maintaining the flexibility of the fabric base substrate 12. The characteristics of the finishing coating 22 are due, in part, to the crosslinked polymer network in the finishing coating 22. The crosslinked polymer network is i) capable of holding applied ink at the image-side 18 (which improves image quality), ii) mechanically strong (which contributes to improved durability), and iii) capable of being applied to form the pore spaces 24 (which contributes to maintaining the flexibility of the fabric base substrate 12).

The finishing coating 22 includes a crosslinked polymer network. As used herein, a "polymer network" refers to a polymer and/or a polymer mixture which can be self-crosslinked, by reaction of different functional groups in the same molecular chain, or inter-crosslinked by reaction with another compound which has a different functional group.

In some example, the finishing coating 22 includes a single polymeric network that is individually crosslinked. In this example, the crosslinked polymer network is selected from the group consisting of polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. Any of the specific examples of the crosslinked polymer networks described herein may be used when the crosslinked polymer network is a single polymeric network.

In some other examples, the finishing coating 22 includes two or more polymeric networks. These polymeric networks may be self-crosslinked and/or may be inter-crosslinked. In some of these other examples, the finishing coating 22 includes two separate polymeric networks that are individually crosslinked. In other words, in some examples, the crosslinked polymeric network includes at least a first crosslinked polymeric network that is crosslinked to itself and a second crosslinked polymeric network that is crosslinked to itself. When the first crosslinked polymeric network and the second crosslinked polymeric network are not crosslinked to one another, they can be entangled or appear layered onto one another. In some other of these other examples, the finishing coating 22 includes the two or more polymeric networks that are crosslinked to one another. For example, the first crosslinked polymeric network can be crosslinked to itself and to the second crosslinked polymeric network (which may also be crosslinked to itself).

In some examples, the crosslinked polymer network includes multiple crosslinked polymeric networks, and the crosslinked polymeric networks are different in their chemical structure, although they may be from the same type or class of polymer (e.g., polyurethane, polyester, etc.). In an example, the crosslinked polymeric network includes a first crosslinked polymeric network and a second crosslinked polymeric network, and the first and second crosslinked polymeric networks are different and independently selected from the group consisting of polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivatives thereof, and combinations thereof.

In some examples of a finishing coating composition that is applied to form the finishing coating 22, the crosslinked polymeric network comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. In some other examples, in the finishing coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

In one example, any example of the crosslinked polymeric network(s) can include a polyacrylate (i.e., a polyacrylate based polymer). Examples of polyacrylates include polymers made by hydrophobic addition monomers, such as $C_1$-$C_{12}$ alkyl acrylates and methacrylates (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, etc.), aromatic monomers (e.g., phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylic containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate, etc.), vinyl benzene monomer, $C_1$-$C_{12}$ alkyl acrylamide and methacrylamide (e.g., t-butyl acrylamide, sec-butyl acrylamide, N,N-dimethylacrylamide, etc.), crosslinking monomers (e.g., divinyl benzene, ethylene glycol dimethacrylate, bis(acryloylamido)methylene, etc.), and combinations thereof. As specific examples, polymers made from the polymerization and/or copolymerization of alkyl acrylate, alkyl methacrylate, and/or vinyl esters may be used. Any of the listed monomers (e.g., hydrophobic addition monomers, aromatic monomers, etc.) may be copolymerized with styrene or a styrene derivative. As specific examples, polymers made from the copolymerization of alkyl acrylate, alkyl methacrylate, and/or vinyl esters, with styrene or styrene derivatives may also be useful.

In one example, the polyacrylate based polymer can include polymers having a glass transition temperature greater than 20° C. In another example, the polyacrylate based polymer can include polymers having a glass transition temperature of greater than 40° C. In yet another example, the polyacrylate based polymer can include polymers having a glass transition temperature of greater than 50° C.

In one example, any example of the crosslinked polymeric network(s) can include a polyurethane. The polyurethane may be a self-crosslinked polyurethane polymer, which may be hydrophilic. The self-crosslinked polyurethane polymer can be formed by reacting an isocyanate with a polyol. Example isocyanates used to form the polyurethane polymer can include toluenediisocyanate, 1,6-hexamethylenediisocyanate, diphenylmethanediisocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetra-isocyanate, triphenyl-methane-tri-isocyanate, tris(iso-cyanate-phenyl)thiophosphate, and combinations thereof. Commercially available isocyanates can include RHODOCOAT® WT 2102 (available from Rhodia AG), BASONAT® LR 8878 (available from BASF), DESMODUR® DA, and BAYHYDUR® 3100 (DESMODUR® and BAYHYDUR® are available from Bayer AG). Example polyols used to form the polyurethane polymer can include 1,4-butanediol, 1,3-propanediol, 1,2-ethanediol, 1,2-propanediol, 1,6-hexanediol, 2-methyl-1,3-propanediol, 2,2-dimethyl-1,3-propanediol, neopentyl glycol, cyclo-hexanedimethanol, 1,2,3-propanetriol, 2-ethyl-2-hydroxymethyl-1,3-propanediol, and combinations thereof.

In some examples, the isocyanate and the polyol can have less than three functional end groups per molecule. In another example, the isocyanate and the polyol can have less than five functional end groups per molecule. In yet another example, the polyurethane can be formed from a polyisocyanate having at least two isocyanate functionalities (—NCO) per molecule and at least one isocyanate reactive group (e.g., such as a polyol having at least two hydroxyl or amine groups). Example polyisocyanates can include diisocyanate monomers and oligomers. The self-crosslinked polyurethane polymer can also be formed by reacting an isocyanate with a polyol, where both isocyanates and polyols have an average of less than three end functional groups per molecule so that the polymeric network is based on a linear polymeric chain structure.

In one example, the polyurethane can be prepared with a NCO/OH ratio ranging from about 1.2 to about 2.2. In another example, the polyurethane can be prepared with a NCO/OH ratio ranging from about 1.4 to about 2.0. In yet another example, the polyurethane can be prepared using an NCO/OH ratio ranging from about 1.6 to about 1.8.

In one example, the weight average molecular weight of the polyurethane polymer used in the first and/or second crosslinked polymeric network can range from about 20,000 Mw to about 200,000 Mw as measured by gel permeation chromatography. In another example, the weight average molecular weight of the polyurethane polymer can range from about 40,000 Mw to about 180,000 Mw as measured by gel permeation chromatography. In yet another example, the weight average molecular weight of the polyurethane polymer can range from about 60,000 Mw to about 140,000 Mw as measured by gel permeation chromatography.

The polyurethane may be aliphatic or aromatic. Some specific examples of commercially available aliphatic waterborne polyurethanes include SANCURE® 1514, SANCURE® 1591, SANCURE® 2260, and SANCURE® 2026 (all of which are available from Lubrizol Inc.). Some specific examples of commercially available caster oil based polyurethanes include ALBERDINGKUSA® CUR 69, ALBERDINGKUSA® CUR 99, and ALBERDINGKUSA® CUR 991 (all from Alberdingk Boley Inc.).

Other examples of the polyurethanes that may make up the first and/or second polymeric network include vinyl-urethane, acrylic urethane, polyurethane-acrylic, polyether polyurethane, polyester polyurethane, polycaprolactam polyurethane, or polyether polyurethane. Any of these examples may be aliphatic or aromatic. For example, the polyurethane may include aromatic polyether polyurethanes, aliphatic polyether polyurethanes, aromatic polyester polyurethanes, aliphatic polyester polyurethanes, aromatic polycaprolactam polyurethanes, or aliphatic polycaprolactam polyurethanes.

In some examples, any example of the crosslinked polymeric network(s) is formed by using vinyl-urethane hybrid copolymers or acrylic-urethane hybrid copolymers. In yet some other examples, the polymeric network(s) includes an aliphatic polyurethane-acrylic hybrid polymer. Representative commercially available examples of the chemicals which can form an acrylic-urethane polymeric network include NEOPAC® R-9000, R-9699 and R-9030 (from Zeneca Resins) or HYRBIDUR™ 570 (from Air Products and Chemicals). In still another example, the polymeric network includes an acrylic-polyester-polyurethane polymer, such as SANCURE® AU 4010 (from Lubrizol Inc.).

In some examples, any example of the crosslinked polymeric network(s) can include a polyether polyurethane. Representative commercially available examples of the chemicals which can form a polyether-urethane polymeric network include ALBERDINGKUSA® U 205, ALBERDINGKUSA® U 410, and ALBERDINGKUSA® U 400N (all from Alberdingk Boley Inc.), or SANCURE®861, SANCURE® 878, SANCURE® 2310, SANCURE® 2710, SANCURE® 2715, or AVALURE® UR445 (equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer" (all from Lubrizol Inc.).

In other examples, any example of the crosslinked polymeric network(s) can include a polyester polyurethane. Representative commercially available examples of the chemicals which can form a polyester-urethane polymeric network include ALBERDINGKUSA® 801, ALBERDINGKUSA® U 910, ALBERDINGKUSA® U 9380, ALBERDINGK® U 2101 and ALBERDINGK® U 420 (all from Alberdingk Boley Inc.), or SANCURE® 815, SANCURE® 825, SANCURE® 835, SANCURE® 843C, SANCURE® 898, SANCURE® 899, SANCURE® 1301, SANCURE® 1511, SANCURE® 2026C, SANCURE® 2255, and SANCURE® 2310 (all from Lubrizol, Inc.).

In still other examples, any example of the crosslinked polymeric network(s) can include a polycarbonate polyurethane. Examples of polycarbonate polyurethanes include ALBERDINGKUSA® U 933 and ALBERDINGKUSA® U 915 (all from Alberdingk Boley Inc.).

Any of the polyurethanes disclosed herein may be crosslinked using a crosslinking agent. In an example, the crosslinking agent can be a blocked polyisocyanate, such as a polyisocyanate blocked using polyalkylene oxide units. In some examples, the blocking units on the blocked polyisocyanate can be removed by heating the blocked polyisocyanate to a temperature at or above the deblocking temperature of the blocked polyisocyanate in order to yield free isocyanate groups. An example of a blocked polyisocyanate can include BAYHYDUR® VP LS 2306 (available from Bayer AG, Germany). In other examples, the polyurethane chain can have a trimethyloxysiloxane group and the crosslinking action can take place by hydrolysis of this functional group to form a silsesquioxane structure. In still other examples, the polyurethane chain can include an acrylic functional group, and the crosslinked structure can be formed by nucleophilic addition to an acrylate group through acetoacetoxy functionality.

In another example, any example of the crosslinked polymeric network(s) can include an epoxy (i.e., an epoxy functional resin). The epoxy can be an alkyl epoxy resin, an alkyl aromatic epoxy resin, an aromatic epoxy resin, epoxy novolac resins, epoxy resin derivatives, and combinations thereof. In some examples, the epoxy can include at least one, or two, or three, or more pendant epoxy moieties. The epoxy can be aliphatic or aromatic, linear, branched, cyclic or acyclic. If cyclic structures are present, they may be linked to other cyclic structures by single bonds, linking moieties, bridge structures, pyro moieties, and the like.

Examples of commercially available epoxy functional resins can include ANCAREZ® AR555 (from Air Products and Chemicals Inc.), EPI-REZ™ 3510W60, EPI-REZ™ 3515W6, and EPI-REZ™ 3522W60 (all available from Hexion Specialty Chemicals), and combinations thereof.

In some examples, the epoxy functional resin can be an aqueous dispersion of an epoxy resin. Examples of commercially available aqueous dispersions of epoxy resins can include ARALDITE® PZ 3901, ARALDITE® PZ 3921, ARALDITE® PZ 3961-1, ARALDITE® PZ 323 (from Huntsman International LLC), WATERPOXY® 1422 (from BASF), ANCAREZ® AR555 (Air Products and Chemicals, Inc.), and combinations thereof.

In yet other examples, the epoxy resin can include a polyglycidyl and/or a polyoxirane resin. These are examples of self-crosslinked epoxy resins. In these examples, a crosslinking reaction can take place either within the resin itself (through catalytic homopolymerization of the oxirane function group) or with the help of a wide range of co-reactants including polyfunctional amines, acids, acid anhydrides, phenols, alcohols, and/or thiols. The polyglycidyl resin and co-reactants are compatible with each other before curing and in liquid state. The term "compatible" refers here to the fact that there is no significant phase separation after mixing in the room temperature.

Examples of the polymeric network(s) including the epoxy may also include an epoxy resin hardener. Some examples of the epoxy resin may be crosslinked by the epoxy resin hardener. Epoxy resin hardeners can be included in solid form, in a water emulsion, and/or in a solvent emulsion. The epoxy resins hardener, in one example, can include liquid aliphatic amine hardeners, cycloaliphatic amine hardeners, amine adducts, amine adducts with alcohols, amine adducts with phenols, amine adducts with alcohols and phenols, amine adducts with emulsifiers, amine adducts with alcohols and emulsifiers, polyamines, polyfunctional polyamines, acids, acid anhydrides, phenols, alcohols, thiols, and combinations thereof. Examples of suitable commercially available epoxy resin hardeners can include ANQUAWHITE® 100 (from Air Products and Chemicals Inc.), ARADUR® 3985 (from Huntsman International LLC), EPIKURE™ 8290-Y-60 (from Hexion), and combinations thereof.

In still another example, any example of the crosslinked polymeric network(s) can include a styrene maleic anhydride (SMA). In one example, the SMA can include NOVACOTE® 2000 (Georgia-Pacific Chemicals LLC). In another example, the styrene maleic anhydride can be combined with an amine terminated polyethylene oxide (PEO), an amine terminated polypropylene oxide (PPO), a copolymer thereof, or a combination thereof. The combination of a styrene maleic anhydride with an amine terminated PEO and/or PPO can strengthen the polymeric network by cross-linking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. The combination of the styrene maleic anhydride with an amine terminated PEO and/or PPO can provide the finishing coating 22 with the glossy features of the SMA while reducing or eliminating the brittle nature of the SMA. Examples of commercially available amine terminated PEO and/or PPO compounds include JEFFAMINE® XTJ-500, JEFFAMINE® XTJ-502, and JEFFAMINE® XTJ D-2000 (all from Huntsman International LLC). In some examples, a weight ratio of the SMA to the amine terminated PEO and/or PPO can range from about 100:1 to about 2.5:1. In other examples, a weight ratio of the SMA to the amine terminated PEO and/or PPO can range from about 90:1 to about 10:1. In yet other examples, a weight ratio of the SMA to the amine terminated PEO and/or PPO can range from about 75:1 to about 25:1.

In some specific examples including multiple polymeric networks, the first and second polymeric networks of the finishing coating 22 include, respectively, a water based epoxy resin and a water based polyamine. In some other specific examples including multiple polymeric networks, the first and second polymeric networks of the finishing coating 22 include, respectively, a vinyl urethane hybrid polymer and a water based epoxy resin, and the finishing coating 22 further includes a water based polyamine epoxy resin hardener. In yet other specific examples including multiple polymeric networks, the first and second polymeric networks of the finishing coating 22 include, respectively, an acrylic-urethane hybrid polymer and a water based epoxy resin, and the finishing coating 22 further includes a water based polyamine epoxy resin hardener. In still further specific examples including multiple polymeric networks, the first and second polymeric networks of the finishing coating 22 include, respectively, a polyurethane and an epoxy resin. In yet a further example including multiple polymeric networks, the first and second polymeric networks of the finishing coating 22 include, respectively, polyoxyethylene glycol sorbitan alkyl esters and polyoxyethylene glycol octylphenol ethers.

When the finishing coating 22 includes a single crosslinked polymeric network, the crosslinked polymeric network can represent from about 80 wt % to about 99 wt % of the total weight of the finishing coating 22. When the finishing coating 22 includes multiple polymeric networks, the finishing coating 22 may include the multiple crosslinked polymeric networks in a variety of amounts. In an example including the first and second polymeric networks, the first and second crosslinked polymeric networks can collectively represent from about 80 wt % to about 99 wt % of the total weight of the finishing coating 22. In another example including the first and second polymeric networks, the first and second crosslinked polymeric networks can collectively represent from about 85 wt % to about 95 wt % of the total weight of the finishing coating 22. In a further example including the first and second polymeric networks, the first and second crosslinked polymeric networks can collectively range from about 85 wt % to about 93 wt % of the total weight of the finishing coating 22. In some examples including the first and second polymeric networks, the first and second crosslinked polymeric networks can be present in equal amounts. In other examples including the first and second polymeric networks, the first and second crosslinked polymeric networks can be present in different amounts.

While the first and second crosslinked polymer networks have been described, it is to be understood that in some examples, the finishing coating 22 can include one or more additional crosslinked polymer networks. Any of the previously described crosslinked polymer networks may be used as the additional network(s).

The finishing coating composition used to form the finishing coating 22 may include, in addition to the polymeric network(s) and water, processing aids, such as rheology control agent(s), surfactant(s) (e.g., BYK-DYNWET 800 from BYK), pH adjuster(s), defoamer(s), optical property modifier(s) (e.g., dye, optical brightening agents (OBA)), or combinations thereof. Any of these aids that are not removed during drying remain in the finishing coating 22. It is to be understood that any of the chemical components in the finishing coating 22, and the finishing coating composition used to form the finishing coating 22, are compatible. In this example, "compatible" means that the components of the finishing coating composition are miscible without phase separation or without forming a layered composition at room temperature. As such, any solid particles, such as fillers, flame retardants, and lubricant wax are excluded from the finishing coating composition. The amount of any given additive included in the finishing coating 22 depends upon the additive, but may range from about 0.1 wt % to about 5 wt % of a total weight of the finishing coating 22.

In examples, the finishing coating 22 has a dry coat-weight of 6 gsm (grams per square meter) or less, such as 4.5 gsm or less, or 2.5 gsm or less. It is to be understood that the gsm of the finishing coating 22 is greater than zero.

Waterproof Coating

As shown in FIG. 1A, some examples of the fabric printable medium 10 further comprise a waterproof coating 26 on the back-side 20 of the coated yarn strands 15. In one example, the waterproof coating 26 may be porous, and thus may be similar to the finishing coating 22 in that it coats the coated yarn strands 15 but allows some of the pore spaces 24 at the back-side 20 to remain open. The average pore size of these pore spaces may be similar to the pore spaces 24, and may depend, in part, upon the coat-weight of the waterproof coating 26. When the waterproof coating 26 has a coat-weight ranging from about 1 gsm to about 2 gsm, the at least some of the pore spaces 24 may remain open. In another example, the waterproof coating 26 may be a continuous filmed layer that covers the coated yarn strands 15 and the pore spaces 24 at the back-side 20 of the coated yarn network 11. When the waterproof coating 26 has a coat-weight greater than 2 gsm, the waterproof coating 26 may be continuous (i.e., the pore spaces 24 are covered).

The waterproof coating 26 provides the back of the fabric printable medium 10 with a low enough surface energy to generate a waterproof function. In an example, the waterproof coating 26 has a surface energy of less than 40 mJ/m$^2$. In another example, the surface energy of the waterproof coating 26 ranges from about 32 mJ/m$^2$ to about 36 mJ/m$^2$. In an example, the waterproof coating 26, and thus the back of the fabric printable medium 10, has a contact angle greater than 60°. In another example, the contact angle of the waterproof coating 26 ranges from about 66° to about 90°. The surface energy and the contact angle contribute to the waterproof function, which keeps the fabric printable medium 10 from absorbing water, e.g., when exposed to outdoor conditions, such as rain or snow. As such, the waterproof coating 26 improves the weather resistance of the fabric printable medium 10.

As shown in FIG. 1A, in some examples, at the back-side 20, the waterproof coating 26 is on a surface of the coated yarn strands 15 and does not penetrate into a depth of the coated yarn strands 15, but rather covers the pore spaces 24. In some instances, it is desirable for the waterproof coating 26 to remain on the back-side 20 so that the waterproof coating 26 does not interfere with the ink receiving function of the finishing coating 22 or deleteriously affect the flexibility and softness of the fabric base substrate 12.

The waterproof coating 26 includes a physical networking agent to help retain the waterproof coating 26 on the back-side 20 (without substantial penetration into the pore spaces 24 among the coated yarn strands 15) and also includes a waterproof agent to obtain the desired surface energy on the back of the medium 10.

The physical networking agent can be a chemical that promotes physical bonding with the waterproof agent to form a gel-like solution or a physical network. A "gel-like solution" can have a low solids content (i.e., from about 5 wt % to about 30 wt %) and a high viscosity (>15,000 cps) at low shear stress (about 6 rpm) when measured by a Brookfield viscometer (Brookfield AMETEK, Massachusetts) at 25° C. In another example, the high viscosity is 20,000 cps at 6 rpm, and in still another example, the high viscosity is 30,000 cps at 6 rpm. A gel-like solution can behave like a non-flowable, semi solid gel, but is able to de-bond at higher shear forces, e.g., 100 rpms or greater, to yield a low viscosity fluid, e.g., less than 500 cps. The gel-like solution is referred to herein as the waterproofing composition.

As such, the waterproofing composition used to form the waterproof coating 26 can have thixotropic behavior. As used herein, "thixotropic behavior" refers to fluids that are non-Newtonian fluids, i.e. which can show a shear stress-dependent change in viscosity. The term "non-Newtonian" refers herein to fluid having a viscosity change that is a non-linear response to a shear rate change. For example, a fluid may exhibit non-linear shear thinning behavior in viscosity with increasing rate of shear. The stronger the thixotropic characteristic of the waterproofing composition when it undergoes shear stress, the lower the viscosity of the waterproofing composition. When the shear stress is removed or reduced, the viscosity can be increased again. Without being limited to any theory, it is believed that such thixotropic behavior reduces the penetration of the waterproofing composition into the fabric base substrate 12 and helps retain the composition at the back-side 20 surface of the coated yarn strands 15. The waterproofing composition becomes thin under shear force when applied by a coating application head (such as under the knife with a floating knife coater). When the waterproofing composition is deposited (the nip of the blade and shear force are removed), the viscosity of fluid can be quickly increased and the waterproof coating 26 can remain on the surface at the back-side 20.

The physical networking agents are high molecular weight polymers, i.e. having a weight average molecular weight ranging from about 300,000 Mw to about 1,000,000 Mw. The physical networking agents can be copolymers of acrylates, copolymers with an acrylate based polyelectrolyte backbone, copolymers with a polyester backbone, or copolymers with a polyurethane backbone. Another suitable physical networking agent is hydroxyethyl cellulose. In some examples, the physical networking agent is selected from the group consisting of copolymers of acrylates, copolymers with an acrylate based polyelectrolyte backbone, copolymers with a polyester backbone, and copolymers with a polyurethane backbone.

In some other examples, the physical networking agent is a copolymer of acrylates, such as a copolymer of methacrylic acid and ethyl acrylate ester; a copolymer having with an acrylate based polyelectrolyte backbone and a weight average molecular weight ranging from about 300,000 Mw to about 1,000,000 Mw; a copolymer having a polyester backbone and a weight average molecular weight ranging from about 300,000 Mw to about 1,000,000 Mw; a copolymer having a polyurethane backbone and a weight average molecular weight ranging from about 300,000 Mw to about 1,000,000 Mw; or a combination thereof. In yet some other examples, the physical networking agent can include an acrylate copolymer, a polyethylene glycol copolymer, a polyurethane copolymer, an isophorone diisocyanate copolymer, or a combination thereof and the physical networking agent can have a weight average molecular weight from 300,000 Mw to 1,000,000 Mw.

In some specific examples, the physical networking agent is a high molecular weight copolymer of acrylates (i.e., having a weight average molecular weight ranging from about 300,000 to about 1,000,000) such as a copolymer of methacrylic acid and ethyl acrylate ester. Examples of such compounds include ACUSOL® 810A, ACUSOL® L830, ACUSOL® 835, and ACUSOL® 842 (from Rohm Haas/Dow Co); or ALCOGUM® L11, ALCOGUM® L12, ALCOGUM® L51, ALCOGUM® L31, and ALCOGUM® L52 (from Akzo Nobel Co); or STEROCOLL® FS (from BASF). In some examples, the physical networking agent is an aqueous anionic dispersion of an ethyl acrylate-carboxylic acid copolymer such as STEROCOLL® FS (from BASF).

In some other specific examples, the physical networking agent is a high molecular weight copolymer with an acrylate based polyelectrolyte backbone. Such high molecular weight copolymers with an acrylate based polyelectrolyte backbone can be, for example, acrylate acid copolymers that include, in the backbone and distributed throughout the polymer chain, grafted pendant groups with long-chain hydrophobic groups and acid groups. Examples of such polymers that are commercially available include TEXICRYL® 13-317, TEXICRYL® 13-313, TEXICRYL® 13-308, and TEXICRYL® 13-312 (all from Scott Bader Group).

In yet some other specific examples, the physical networking agent is a high weight average molecular weight copolymer with a polyester backbone. Such high molecular weight copolymers with a polyester backbone can be, for example, polyethylene glycol copolymers that include, in the backbone and distributed throughout the polymer chain, grafted pendant with long-chain hydrophobic groups and polar groups. Examples of such polymers that are commercially available include RHEOVIS® PE from BASF.

In still further specific examples, the physical networking agent is a high weight average molecular weight copolymer with a polyurethane backbone. Such high molecular weight copolymers with a polyurethane backbone can be, for example, copolymers of polyethylene glycol and isophorone diisocyanate, which can have long-chain alkanols at the end-caps and also backbone distributed throughout the polymer chain. Examples of such polymers that are commercially available include ACUSOL® 880 and ACUSOL® 882 (from Rohm Haas).

Still another example of a suitable physical networking agent is hydroxyethyl cellulose. An example that is commercially available is TYLOSE® HS30000 (from SE Tylose GmbH & Co. KG).

Examples of the waterproof agent include polyvinylidene chloride (PVC), a polyolefin, poly(ethylene terephthalate), a wax, perfluorooctane sulfonate, perfluorooctanoic acid, a hydrogen siloxane, a long chain hydrocarbon, and a modified fatty resin. Examples of the polyolefin include polyethylene, polypropylene, or combinations thereof. Examples of the long chain hydrocarbons include at least 100 repeating units. Commercially available examples of the long chain hydrocarbon include BAYGARD® WRC (from Tanatex Chemicals) and ECOREPEL® (from Schoeller). Commercially available examples of the modified fatty resins include PHOBOTEX® RHP, PHOBOTEX® RSH, and PHOBOTEX® RHW (from Huntsman International LLC). Microencapsulated waterproofing chemicals, such as SMARTREPEL® Hydro (from Archroma) may also be used. In still another example, a fluorinated acrylic copolymer, such as PHOBOL® CP-C from Hunstman International LLC, may be used.

In some specific examples, the waterproof coating 26 includes a physical networking agent selected from the group consisting of an acrylate copolymer, a polyacrylic acid copolymer, a polyether copolymer, a polyurethane copolymer, and combinations thereof, the physical networking agent having a weight average molecular weight from 300,000 Mw to 1,000,000 Mw; and a waterproof agent selected from the group consisting of polyvinylidene chloride, a polyolefin, poly(ethylene terephthalate), a wax, perfluorooctane sulfonate, perfluorooctanoic acid, a hydrogen siloxane, a long chain hydrocarbon, and a modified fatty resin.

Other functional additives may be included in the waterproof coating 26. Functional additives can be added to control a specific property. Some examples include surfactant(s) for wettability, defoamer(s) for processing control, base or acid buffer(s) for pH control.

Depending on the thixotropic behavior of the waterproof composition and the chemical environment of the waterproof composition (e.g., such as the pH), the weight ratio of water:waterproof agent:physical networking agent:additives may be 100:2:0.8:0.2, and in another example, the ratio may be 100:2:0.55:0.2.

The waterproof coating 26 may have dry coat-weight ranging from about 0.5 gsm to about 5 gsm, or from about 1 to about 3 gsm.

Method for Forming the Fabric Printable Medium

Figure 2:
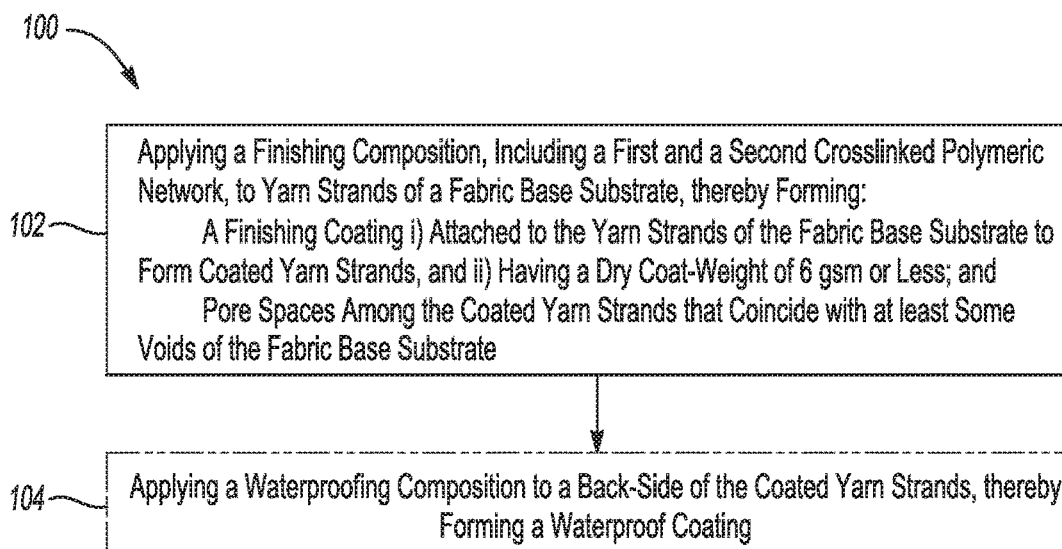
FIG. 2 is a flow diagram illustrating an example of a method for forming an example of the fabric printable medium.

An example of the method 100 for forming the fabric printable medium 10 is depicted in FIG. 2. As shown in FIG. 2, the method 100 includes applying a finishing composition, including a first and a second crosslinked polymeric network, to yarn strands 14 of a fabric base substrate 12, thereby forming a finishing coating 22 i) attached to the yarn strands 14 of the fabric base substrate 12 to form coated yarn strands 15, and ii) having a dry coat-weight of 6 gsm or less (as shown at reference numeral 102); and pore spaces 24 among the coated yarn strands 15 that coincide with at least some voids 16 of the fabric base substrate 12. Some examples of the method 100 further comprise applying a waterproofing composition to a back-side 20 of the coated yarn strands 15, thereby forming a waterproof coating 26 (as shown at reference numeral 104 in phantom).

The finishing composition used to form the finishing coating 22 is an aqueous dispersion of the crosslinked polymeric network(s) described herein. The single crosslinked polymeric network alone can represent, or the first and second crosslinked polymeric networks can collectively represent, from about 80% to about 99% of the total solids the finishing composition, and the rest may include processing aids that are miscible without phase separation or without forming a layered composition at room temperature. The aqueous dispersion has a solids content of 8% or less. In some instances, the solids content of the finishing composition is 7% or less, or 5% or less, or 2.5% or less. It is believed that this solids content contributes to the formation of the pore spaces 24.

To apply the finishing composition, any suitable coating technique may be used that will allow the composition to adhere to the yarn strands 14 without filling at least some of the voids 16. The application of the finishing composition involves using a coating technique to apply the finishing composition, and drying the applied finishing composition. In one example, the finishing composition is applied using a padding process. In this example, the fabric base substrate 12 is immersed into the finishing composition and the yarn strands 14 throughout the fabric base substrate 12 are wetted by the finishing composition. Any excess finishing composition may be pushed out by a pair of rolls preset with constant pressure (e.g., ranging from about 10 PSI to about 200 PSI). The composition is then padded by passing the fabric base substrate 12 having the finishing composition thereon through nips. The nip width and the total pick up of the finishing composition are substantially constant over the substrate 12 width and along the whole length of the roll. The finishing composition may then be dried and thermally cured to form the finishing coating 22 and the coated yarn strands 15. In an example, drying takes place in an infrared (IR) oven with a peak temperature of about 170° C. The peak temperature may vary depending upon the first and second polymeric networks being coated. Drying may take place in different temperature zones to gradually bring the temperature of the coated substrate 12 up and back down. The various temperatures may range from about 80° C. to about 175° C. In another example, the various temperatures may range from about 120° C. to about 170° C.

Other coating techniques for the finishing composition include a floating knife process or a knife on roll mechanism process. The floating knife process can include stretching the fabric base substrate 12 to form an even uniform surface. The floating knife process can further include transporting the fabric under a stationary knife blade. The knife-on-the roll mechanism (used to apply the composition) can be followed by passing the substrate 12 and finishing composition through calendering pressure nips. The calendering can be done either in room temperature or at an elevated temperature and/or pressure. The elevated temperature can range from about 40° C. to about 100° C., and the elevated pressure can range from about 500 PSI to about 3,000 PSI.

With the formulation of the finishing composition and the processing parameters, the continuous film of the finishing composition around each voids 16 in the fabric base substrate 12 begins to break during the drying process. The surface tension of the finishing composition helps maintain the substantially open structure of the pore spaces 24 while the finishing composition stays firmly on the yarn strand 14 surface.

In some examples of the method 100, the waterproof coating 26 is applied after the finishing coating 22 is applied. This may minimize any adhesion impact to the finishing coating 22.

The waterproof composition includes the physical networking agent and the waterproofing agent. In the composition, the waterproofing agent may be in the form of an emulsion. As such, in an example, the waterproof composition includes a physical networking agent selected from the group consisting of an acrylate copolymer, a polyacrylic acid copolymer, a polyether copolymer, a polyurethane copolymer, and combinations thereof, the physical networking agent having a weight average molecular weight from 300,000 Mw to 1,000,000 Mw; and a waterproof agent selected from the group consisting of polyvinylidene chloride emulsion, a polyolefin emulsion, a poly(ethylene terephthalate) emulsion, an aqueous wax emulsion, a perfluorooctane sulfonate emulsion, a perfluorooctanoic acid emulsion, a hydrogen siloxane emulsion, a long chain hydrocarbon emulsion, and a modified fatty resin emulsion.

Any of the previously described coating techniques may be used to apply the waterproof composition to form the waterproof coating 26. One example of a suitable coating technique includes padding, where the fabric base substrate 12 is immersed into the waterproof composition and then exposed to padding by going through pressure nips. In another example, the treatment process is achieved by floating knife, where the fabric base substrate 12 is stretched flat to form an even uniform surface and is transported under a stationary doctor blade. In still another example, the treatment process is achieved by rod coating where a rod (such as Mayer rod) is used to control the amount of the treatment compound. Further, in another example, the treatment process is achieved by air knife coating where pressure air is induced to control the amount of the waterproof composition.

As mentioned above, the waterproof composition is gel-like solution that becomes thin under shear force when applied by a coating application head (such as under the knife with a floating knife coater). When the waterproofing composition is deposited (and the nip of the blade and shear force are removed) (at more than 2 gsm), the viscosity of fluid can be quickly increased and the waterproof coating 26 can remain on the surface at the back-side 20 of the coated yarn strands 15. In contrast, when the amount of the waterproofing composition that is applied is lower (2 gsm or less), the waterproof coating 26 is able to coat the yarn strands 15 and maintain some of the open pore spaces 24.

The applied waterproof composition may then be exposed to drying to form the waterproof coating 26.

Printing Method

Figure 3:
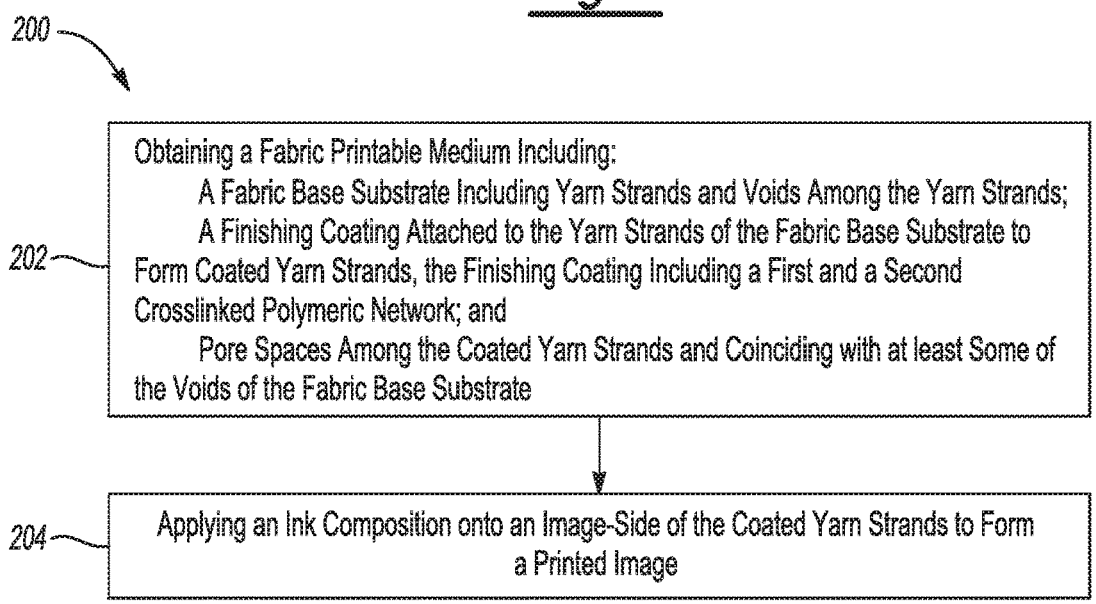
FIG. 3 is a flow diagram illustrating an example of a printing method disclosed herein.

An example of the printing method 200 is depicted in FIG. 3. As shown in FIG. 3, the method 200 includes obtaining a fabric printable medium 10 including: a fabric base substrate 12 including yarn strands 14 and voids 16 among the yarn strands 14; a finishing coating 22 attached to the yarn strands 14 of the fabric base substrate 12 to form coated yarn strands 15, the finishing coating 22 including a first and a second crosslinked polymeric network; and pore spaces 24 among the coated yarn strands 15 and coinciding with at least some of the voids 16 of the fabric base substrate 12 (as shown at reference numeral 202); and applying an ink composition onto an image-side 18 of the coated yarn strands 15 to form a printed image (as shown at reference numeral 204). In some examples, the fabric printable medium 10 that is provided further includes the waterproof coating 26 attached to the coated yarn strands 15 on the back-side 20. In some examples, when needed, the printed image can be dried using any drying device attached to a printer such as, for instance, an IR heater.

Any example of the fabric printable medium 10 disclosed herein may be used in the method 200. The ink is printed onto the image-side 18, which has the finishing coating 22 exposed. The finishing coating 22 may be particularly suitable to receive aqueous pigmented inks (e.g., aqueous latex inks) to generate vivid and sharp images. The finishing coating 22 functions as an ink receiving coating since, during the printing process, ink(s) will be directly deposited thereon. The printed image will have, for instance, enhanced image quality and durability.

In some examples of the method 200, printing is accomplished at speeds needed for commercial and other printers such as, for example, HP Latex printers such as 360, 560, 1500, 3200 and 3600 (HP Inc., Palo Alto, Calif., USA).

In some examples, the ink composition is an inkjet ink composition that contains one or more colorants that impart the desired color to the printed image and a liquid vehicle.

As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art.

As used herein, "liquid vehicle" is defined to include any liquid composition that is used to carry colorants, including pigments, to the fabric printable medium 10 disclosed herein. A wide variety of liquid vehicle components may be used and include, as examples, water or any kind of solvents.

In some other examples, the ink composition, applied to the fabric printable medium 10, is an ink composition containing latex components. Latex components are, for examples, polymeric particulates dispersed in water. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have a weight average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are in the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

To further illustrate the present disclosure, an example is given herein. It is to be understood this example is provided for illustrative purposes and is not to be construed as limiting the scope of the present disclosure.

Example

A control fabric base substrate (without any coating thereon) was used. Two examples of the fabric printable medium disclosed herein were prepared. Two comparative example fabric media were also prepared.

The control fabric base substrate was a 100% polyester fabric, and the polyester strands had a plain weave. The basis weight was 105 gsm. The same polyester fabric with plain weave and 105 gsm was used to prepare the example fabric printable media (E1 and E2) and the comparative example media (C1 and C2).

Each of the example fabric printable media and the comparative example media were coated with a finishing composition, except that the solids content for the example finishing compositions was 5% or less and the solids content for the comparative example finishing compositions was 10% or more. Table 1 shows the composition of the finishing composition.

TABLE 1

| Finishing composition | | |
|---|---|---|
| Component Type | Specific Component | Parts (by dry weight) |
| Surface tension control agent | Byk-Dynwet ® 800 (from BYK) | 0.2 |
| First crosslinked polymeric network | Araldite ® PZ 3901 (from Huntsman International LLC) | 5 |
| Crosslinker for first crosslinked polymeric network | Aradur ® 3985 (from Huntsman International LLC) | 5 |
| Second crosslinked polymeric network | Sancure ® 2026 (from Lubrizol Inc.) | 6 |
| Third crosslinked polymeric network | Sancure ® AU 4010 (from Lubrizol Inc.) | 5 |
| Balance of formulation | Water | Adjust to appropriate solids content |

The finishing coating was made by depositing the finishing composition on the fabric base substrate using a lab Methis padder with the speed of 5 meters per minute, and then the applied composition was dried using an IR oven with peak temperature 120° C.

Each of the example fabric printable media and the comparative example media was coated with a waterproofing composition. Table 2 shows the composition of the waterproof composition.

TABLE 2

| Waterproofing Composition | | |
|---|---|---|
| Component Type | Specific Component | Parts (by dry weight) |
| Waterproof agent | Phobol ® (from Huntsman International LLC) | 100 |
| Physical Networking Agent | Tylose ® HS30000 (from SE Tylose GmbH & Co. KG) | Adjust to appropriate viscosity |
| Balance of formulation | Water | Adjust to appropriate solids content |

After padding the finishing composition, the back side waterproof composition was applied by a Methis lab blade coater equipped with an IR dryer. The blade used was a 90 degree flat blade. The coat-weight of the waterproof coating on the examples ranged from 1.5 gsm to 2 gsm, and the coat-weight of the waterproof coating on the comparative examples ranged from greater than 2 gsm to 5 gsm.

For both padding operations, the padding pressure was 50 PSI, speed setting was 0.25, and dryer temperature was 100° C., 120° C. and 90° C. for each zone.

The dry coat-weight and various coatings applied to the examples and comparative examples are shown in Table 3.

TABLE 3

| Example ID | Dry Coat-Weight of Finishing Coating | WaterProof Coating (Dry Coat-Weight) |
|---|---|---|
| E1 | 1 to 2 gsm | Yes (1.5 to 2 gsm) |
| E2 | 1 to 2 gsm | Yes (1.5 to 2 gsm) |
| C1 | 8 to 10 gsm | Yes (2 to 5 gsm) |
| C2 | 8 to 10 gsm | Yes (2 to 5 gsm) |

Images were printed on each of the media using latex inks and an HP L-560 printer.

The example and comparative example media were tested for porosity, hole openness under microscopy, media gloss, black optical density, 72 color gamut, coin scratch, dry rub, folding resistance, and wind resistance.

Porosity was measured by testing the air flow (mL/min) through the medium per Tappi method T526 (e.g., using a Hagerty Technologies instrument (from Technidyne)) or per Tappi method T-555 (e.g., using a Parker Print-Surf instrument (from Testing Machines, Inc.)). Hole openness was evaluated under microscope, and these results were given a rating of 5=best (open pores) and 1=worst (pores closed). Media gloss was tested using a gloss meter from BYK Gardner, which measures gloss at 60°. Black optical density measures the black color intensity, and was measured using an X-rite spectrodensitometer from X-Rite Inc. 72 color gamut tests the portion of the color space that is represented or reproduced, and, in this example, was tested using a Gregtag/Mcbeth Spectrolina Spectroscan or a Barberie. The coin scratch was tested using a round metal piece that was dragged against the ink to demonstrate its resistance to removal (Taber Industries, 5750 linear abraser, used coin holder). These results were given a rating of 5=best (no ink removal) and 1=worst (ink removed). The dry rub was tested using a cloth wrapped on one end of solid cylinder surface that comes in contact on the ink and is rubbed back and forth 5 times with certain weight ranging from 180 g to 800 g (Taber Industries, 5750 linear abraser, used coin holder and cloth). These results were given a rating of 5=best (no ink removal) and 1=worst (ink removed). Folding resistance was tested by folding the medium like a bed sheet 4 times, and then placing a 20 pound weight on the folded medium for 30 minutes. These results were given a rating of 5=best (no ink removal) and 1=worst (ink removed/white lines formed). The wind resistance was tested using a large fan with a 1 foot diameter duct to output air up to 35 miles per hour on a vertically mounted banner of the media. The wind exerts force on the loose end of the banner to test for ink adhesion and media durability. These results were given a rating of 5=best (no ink removal and no media shredding) and 1=worst (ink removed/media shredding). Table 4 illustrates the results.

TABLE 4

| Example ID | Porosity (Hole Openness) | Media Gloss | Black Optical Density (KOD) | 72 Color Gamut | Coin Scratch | Dry Rub | Folding Resistance | Wind Resistance |
|---|---|---|---|---|---|---|---|---|
| Control | 478 (5 - open) | NA | NA | NA | NA | NA | NA | NA |
| E1 | 478 (5 - open) | 3.7 | 1.3 | ~256K | 4 | 4 | 4 | 4.5 |
| E2 | 303 (5 - open) | 3.0 | 1.2 | ~182K | 3.5 | 4 | 4 | 4 |
| C1 | 5.4 (2.5 - part open) | 3.3 | 1.3 | ~186K | 3 | 3 | 4 | 2 |
| C2 | 1.25 (1 - closed) | 3.1 | 1.4 | ~261K | 3 | 4 | 3 | 2 |

The higher porosity level of the examples indicated that the voids of the fabric base substrate were not blocked by the finishing coating, and thus pore spaces remained among the coated yarn strands of the examples. The lower porosity level of the comparative examples indicated that most, if not all of the voids of the fabric base substrate were blocked by the finishing coating, and thus the finishing coating was a continuous or mostly continuous layer. The examples E1 and E2 with the open porosity performed better than the comparative examples C1 and C2 with less or no open pores, in terms of overall durability (e.g., coin scratch, dry rub, fold resistance and wind resistance). The results were similar in terms of image quality (e.g., gloss and color performance, e.g., KOD and color gamut), and thus the non-continuous finishing coating is a suitable ink receiving coating.

It is to be understood that the ranges provided herein include the stated range and any value or sub-range within the stated range. For example, from about 40° C. to about 100° C. should be interpreted to include not only the explicitly recited limits of from about 40° C. to about 100° C., but also to include individual values, such as about 55.5° C., about 77.74° C., about 84° C., about 95° C., etc., and sub-ranges, such as from about 46° C. to about 86° C., from about 60.5° C. to about 90.5° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A fabric printable medium, comprising:
    a fabric base substrate including yarn strands and voids among the yarn strands;
    a finishing coating attached to the yarn strands of the fabric base substrate to form coated yarn strands, the finishing coating including a first and a second crosslinked polymeric network, wherein the first and second crosslinked polymeric networks collectively represent from about 80 wt % to about 99 wt % of a total weight of the finishing coating; and
    pore spaces among the coated yarn strands and coinciding with at least some of the voids of the fabric base substrate.

2. The fabric printable medium as defined in claim 1 wherein the finishing coating has a dry coat-weight of 6 gsm or less.

3. The fabric printable medium as defined in claim 1 wherein the finishing coating is coated on surfaces of the yarn strands throughout a depth of the fabric base substrate.

4. The fabric printable medium as defined in claim 1 wherein the first crosslinked polymeric network and the second crosslinked polymeric network are different and independently selected from the group consisting of polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivatives thereof, and combinations thereof.

5. The fabric printable medium as defined in claim 1, further comprising a waterproof coating attached to a back-side of the coated yarn strands.

6. The fabric printable medium as defined in claim 5 wherein the waterproof coating has a contact angle greater than 60°.

7. A fabric printable medium, comprising:
    a fabric base substrate including yarn strands and voids among the yarn strands;
    a finishing coating attached to the yarn strands of the fabric base substrate to form coated yarn strands, the finishing coating including a first and a second crosslinked polymeric network;
    pore spaces among the coated yarn strands and coinciding with at least some of the voids of the fabric base substrate;
    a waterproof coating attached to a back-side of the coated yarn strands, wherein the waterproof coating includes:
        a physical networking agent selected from the group consisting of an acrylate copolymer, a polyacrylic acid copolymer, a polyether copolymer, a polyurethane copolymer, and combinations thereof, the physical networking agent having a weight average molecular weight from 300,000 Mw to 1,000,000 Mw; and
        a waterproof agent selected from the group consisting of polyvinylidene chloride, a polyolefin, poly(ethylene terephthalate), a wax, perfluorooctane sulfonate, perfluorooctanoic acid, a hydrogen siloxane, a long chain hydrocarbon, and a modified fatty resin.

8. The fabric printable medium as defined in claim 5 wherein the waterproof coating has a surface energy of less than 40 mJ/m$^2$.

9. The fabric printable medium as defined in claim 1 wherein at least 33% of the voids of the fabric base substrate coincide with the pore spaces.

10. A method for forming a fabric printable medium, comprising:
    applying a finishing composition, including a first and a second crosslinked polymeric network, to yarn strands of a fabric base substrate, thereby forming a finishing coating i) attached to the yarn strands of the fabric base substrate to form coated yarn strands, and ii) having a dry coat-weight of 6 gsm or less; and pore spaces among the coated yarn strands that coincide with at least some voids of the fabric base substrate, wherein the first and second crosslinked polymeric networks collectively represent from about 80 wt % to about 99 wt % of a total weight of the finishing coating.

11. The method as defined in claim 10, further comprising applying a waterproofing composition to a back-side of the coated yarn strands, thereby forming a waterproof coating.

12. The method as defined in claim 10 wherein the finishing composition is an aqueous dispersion having a solids content of 8% or less.

13. The method as defined in claim 10 wherein the application of the finishing composition involves:
    using a coating technique to apply the finishing composition; and
    drying the applied finishing composition.

14. A printing method, comprising:
obtaining a fabric printable medium including:
- a fabric base substrate including yarn strands and voids among the yarn strands;
- a finishing coating attached to the yarn strands of the fabric base substrate to form coated yarn strands, the finishing coating including a first and a second crosslinked polymeric network, wherein the first and second crosslinked polymeric networks collectively represent from about 80 wt % to about 99 wt % of a total weight of the finishing coating; and
- pore spaces among the coated yarn strands and coinciding with at least some of the voids of the fabric base substrate; and applying an ink composition onto an image-side of the coated yarn strands to form a printed image.

15. The fabric printable medium as defined in claim 7 wherein the waterproof coating has a contact angle greater than 60°.

16. The fabric printable medium as defined in claim 7 wherein the waterproof coating has a surface energy of less than 40 mJ/m$^2$.

* * * * *